(12) United States Patent
Denham

(10) Patent No.: US 6,389,676 B1
(45) Date of Patent: May 21, 2002

(54) BLIND RIVETING

(75) Inventor: Keith Denham, Welwyn Garden (GB)

(73) Assignee: Textron Fastening Systems Limited, Hertfordshire (GB)

( * ) Notice: Subject to any disclaimer, the term of this patent is extended or adjusted under 35 U.S.C. 154(b) by 0 days.

(21) Appl. No.: 09/509,913

(22) PCT Filed: Oct. 5, 1998

(86) PCT No.: PCT/GB98/02983

§ 371 Date: Jun. 16, 2000

§ 102(e) Date: Jun. 16, 2000

(87) PCT Pub. No.: WO99/19097

PCT Pub. Date: Apr. 22, 1999

(30) Foreign Application Priority Data

Oct. 10, 1997 (GB) .............................................. 9721538

(51) Int. Cl.⁷ ................................................ B21J 15/02
(52) U.S. Cl. .............................. 29/525.06; 29/243.522; 29/243.529; 227/51
(58) Field of Search ....................... 29/525.06, 243.521, 29/243.522, 243.529, 243.53; 72/391.4; 227/51, 52

(56) References Cited

U.S. PATENT DOCUMENTS 3,686,914 A * 8/1972 Powsey
3,934,325 A * 1/1976 Jaffe ..................... 29/243.529

FOREIGN PATENT DOCUMENTS

| BE | 389137 | * | 6/1932 | |
|---|---|---|---|---|
| BE | 555416 | * | 2/1960 | ............ 29/243.522 |
| EP | 0489635 A1 | | 6/1992 | |
| EP | 663535 | * | 7/1995 | |
| EP | 0663535 A1 | | 7/1995 | |
| EP | 0705986 A1 | | 4/1996 | |
| GB | 511588 | | 2/1938 | |
| GB | 613882 | * | 12/1948 | |
| GB | 887799 | | 1/1962 | |
| GB | 956322 | | 4/1964 | |
| GB | 1180542 | | 2/1970 | |
| GB | 1205744 | | 9/1970 | |

* cited by examiner

Primary Examiner—Flemming Saether
(74) Attorney, Agent, or Firm—Trexler, Bushnell, Giangiorgi, Blackstone & marr, Ltd.

(57) ABSTRACT

A method of blind riveting to secure together a plurality of members (26, 27, 28) with aligned apertures, using a blind rivet comprising a tubular shell (11) with a head (13) and a stem (12) extending through the tubular shell. The method comprises the steps of: inserting the shell through the aligned apertures, from the near face of the near member, so that the remote end of the shell protrude beyond the remote face of the remote member and the nearest end of the shell is substantially level with the near face of the near member; supporting the near end of the shell while pulling the stem head to form a remote blind head; applying a force to the near member with respect to the stem, until any gap (28) between the members is taken up and deforming the now protruding portion of the shell to form a near-side head of the rivet. The invention also encompasses a blind riveting apparatus and blind rivets for carrying out the method described above.

7 Claims, 6 Drawing Sheets

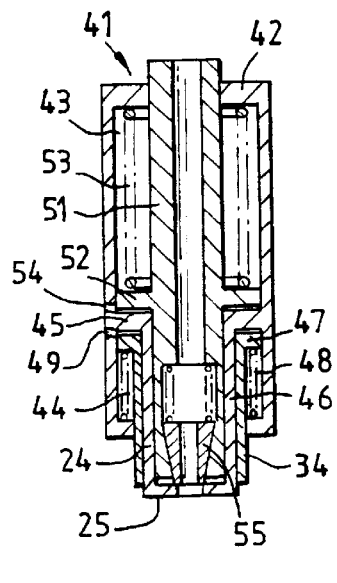
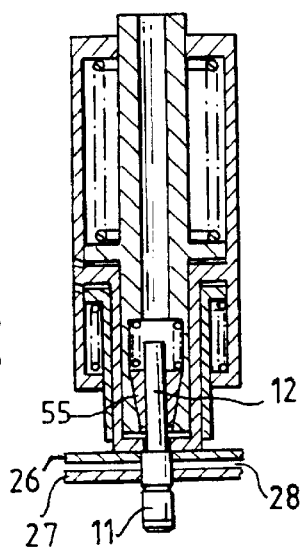
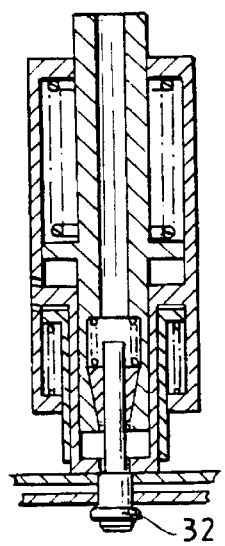
Fig. 3A.  Fig. 3B.  Fig. 3C.
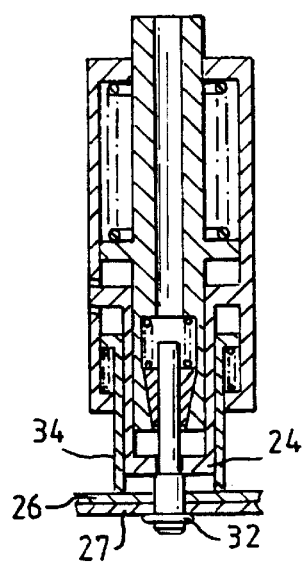
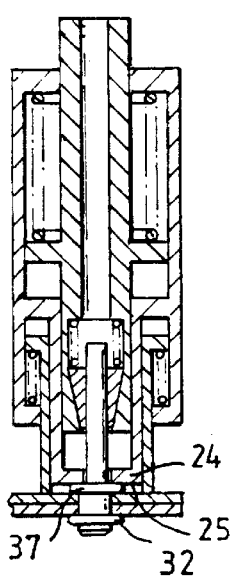
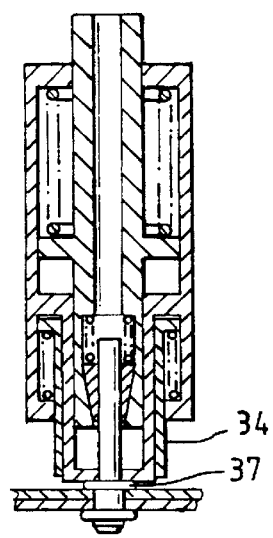
Fig. 3D.  Fig. 3E.  Fig. 3F.

BLIND RIVETING

BACKGROUND

Blind rivets (i.e. rivets which can be installed by access to one side only of the workpiece) are well known. Commonly a blind rivet comprises a tubular shell having an elongated shank with a preformed radially enlarged shell head at one end (the head end), in combination with a stem extending through the tubular shell and having a radially enlarged stem head at one end thereof (the head end) adjacent the other end (the tail end) of the shell shank. The other end portion of the stem protrudes from the head end of the shell. The shell shank is inserted through aligned apertures in the workpiece comprising the members to be riveted together so that the shell head abuts the near face of the workpiece and the tail end portion of the shell shank protrudes beyond the remote face (the blind face) of the workpiece. An increasing pulling force is then applied to the protruding portion of the stem relative to the shell, the reaction force being supported by the shell head, so that the stem head deforms the tail end portion of the shell shank radially outwards and axially towards the shell head, to form a blind head which abuts the blind face of the workpiece. The workpiece members are thus clamped together between the shell's preformed head and its blind head. Usually the stem is then broken off flush with, or slightly inside, the head of the shell, at a breakneck preformed at the appropriate position along the stem. The breakneck breaking load is at a tension load which is greater than the load needed to completely form the blind head.

Such blind rivets and the method of using them are well known.

Blind rivets which provide a high level of static and dynamic joint strength need to develop a high retained compressive force on the workpiece, between the preformed and blind heads, and to have a relatively large preformed head and also a blind side head which has a relatively large diameter in contact with the blind face of the workpiece, i.e. a relatively large blind side footprint. An example of such a blind rivet is described in GB 2 151 738 A, and is widely available under the registered trademark HEMLOK.

One problem with such high joint-strength rivets in the past is that they have been restricted in the amount of joint gap closure they can provide, i.e. the amount of gap initially present between the members to be joined, which the rivet can successfully close up during installation in the members, is limited.

SUMMARY

The present invention aims to overcome this problem, and aims to provide a blind rivet which develops a large blind-side head footprint, an enhanced sheet gapclosing ability and also produces a large compressive force on the completed joint.

GB 613882 discloses a blind rivet having a shell without a preformed head, and a method of riveting involving applying axial compression to the shell to form both the blind and near side heads. However the rivet is such that formation of the near side head is completed before formation of the blind side head begins. Furthermore the rivet comprises only a tubular shell without a stem, the placing tool being provided with a reusable mandrel which is removed from the rivet shell after the latter has been completely deformed.

GB 511588 (Chobert), a divisional of GB 511,531, describes a tubular riveting system for securing workpieces together. This earlier method employs a pull-through mandrel having an enlarged head. The riveting tool incorporates an inner sleeve around the mandrel, the sleeve having a smaller diameter than the hole in the workpieces and smaller diameter than the undeformed rivet. The workpieces are thus constrained against the force of the mandrel by the outer part of the tool. However, this prior art relates to pull-through riveting and is not directly applicable to breakstem riveting. Furthermore, the dimensions of the riveting tool do not allow space for a head to form on the rivet unless a countersink is provided in the workpiece nearest the tool.

BRIEF DESCRIPTION OF THE DRAWING

Some embodiments of the present invention will now be described by way of example and with reference to the accompanying drawings, in which:

FIGS. 3A to 3F show six successive stages in the action of deforming the rivet of FIGS. 1A to 1C or 2A to 2E by means of a hydraulically-powered riveting tool;

DESCRIPTION

Figure 1A:
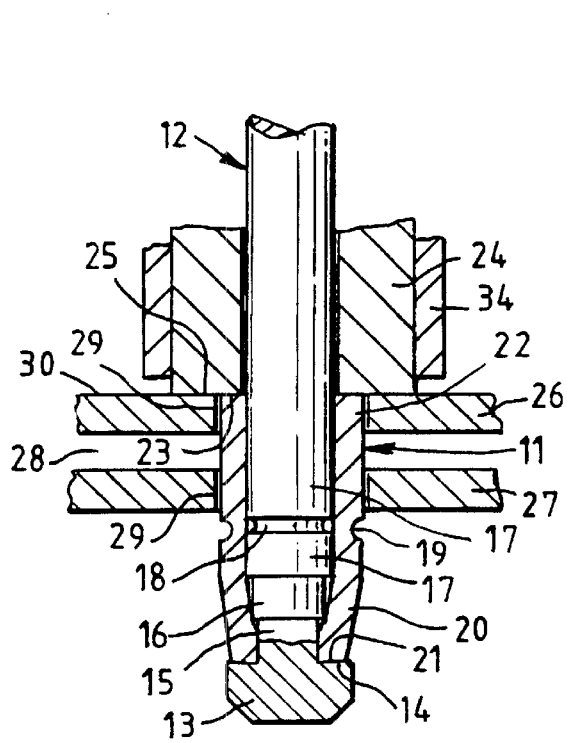
FIGS. 1A, 1B and 1C show three successive stages in the deformation of the shell of a first example rivet to form a blind head.

In the various FIGS. 1, 2, 3, 4, 5 and 6, like or corresponding parts of the various rivets, and the placing tool, are indicated by like numerals for ease of understanding and comparison. Thus, all of the example rivets each comprises a tubular shell 11 of low carbon steel and a stem 12 of medium carbon steel. The stem has a radially enlarged head 13 at one end of slightly less diameter than the tubular shell. The stem and shell are assembled so that the stem head 13 is adjacent one face 21 (the tail end face) of the shell. The underhead face 14 is of slightly concavely dished, or part-conical, shape. The major portion 17 of the stem 12 is of uniform diameter, on which the inner wall of the shell is a close fit. However, the portion 15 of the stem immediately adjacent the stem head 13 is of reduced diameter, and this is joined to the remainder 17 of the stem by a transition portion 16 of a diameter intermediate the portion 15 and the major portion 17 of the stem. The stem portion 17 is provided with a breakneck 18 in the well understood way. The shell 11 is provided with an external circumferential groove 19, which in this example rivet is about half-way between the ends of the shell. On assembly of the shell and stem, the tailmost end portion 20 of the shell, which overlies the stem portions 15 and 16, is crimped or rolled inwardly into contact with those portions, as illustrated in FIG. 1A, so that its inside and outside diameter tapers inwardly. The tail end face 21 of the shell abuts the head underface 14 as shown in FIG. 1A. The end 22 of the shell remote from the tail end face 21 is not preformed with a radially enlarged head, as is usual in blind riveting practice, but is of substantially uniform diameter and has a flat "head" end face 23.

Accordingly the tool employed to place the rivet (which tool is illustrated in FIG. 3) is provided with a nosepiece 24 (illustrated schematically in FIGS. 1, 2, 4, 5 and 6) which has a flat annular anvil face 25. This face 25 is of substantially larger external diameter than the rivet shell 11. The tool is provided with jaws to grip the stem and pulling means, as is illustrated in FIG. 3. The rivet stem 12 is inserted into the nosepiece and the stem is gripped by the jaws. The rivet is used to join together two metal sheets 26, 27, there being a gap 28 between the near sheet 26 and the remote or blind side sheet 27. The rivet is inserted into the aligned apertures 29, 29 in the sheets, in which the shell is a sliding fit, until the anvil face 25 abuts the near face 30 of the near sheet. Thus the "head" end face 23 of the rivet shell is substantially level with the near face 30. The remote end of the shell including the shell circumferential groove 19 protrudes beyond the remote sheet 27.

The tool is also provided with a sleeve 34 outside the nosepiece 24, the purpose of which will be described later.

The tool is then actuated to apply a progressively increasing tension force F1 to the stem 12 with respect to the nosepiece 24 which takes up the reaction force F2 against the end face 23 of the shell 11. The axial compression thus applied to the shell by the anvil face 25 and the underface 14 of the stem head 13, causes the tailmost portion 20 of the shell to buckle outwardly as shown in FIG. 1B to form a bulb 31 between the groove 19 and the end 21 of the shell. Deformation in this way is promoted by weakening groove 19 in the shell, the tapered configuration of the portion 20 of the shell and the interengagement between the tail end face 21 of the shell and the underhead face 14 of the stem head. However it will be apparent to the man skilled in the art of blind rivet design that there are alternative and/or additional ways of promoting deformation of the tailmost portion of the shell.

Figure 1B:
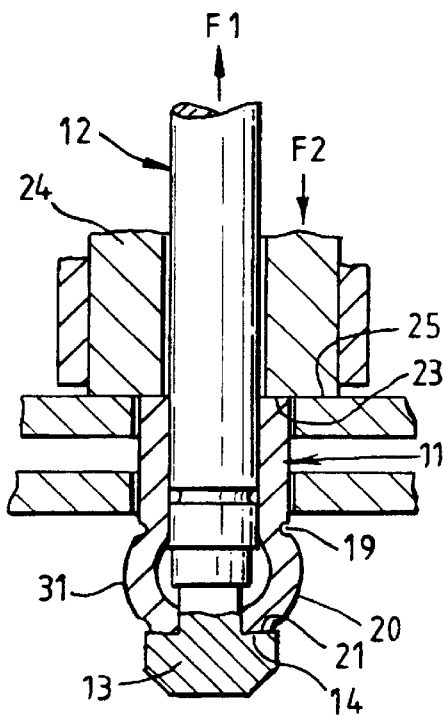
Figure 1C:
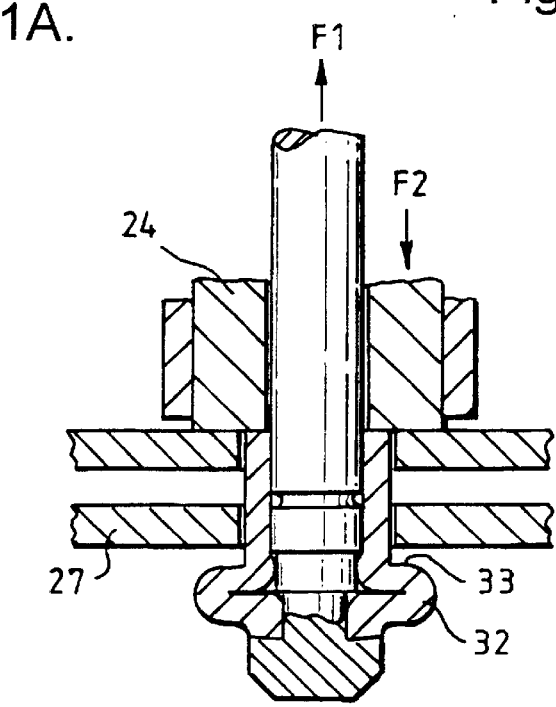

As the opposing forces F1 and F2 are increased, the bulb 31 of FIG. 1B further collapses axially until it forms a blind head 32 on the shell in the form of a folded flange, as shown in FIG. 1C. This blind head is of relatively large diameter and has a face 33 towards the near sheet 27 which is substantially flat and parallel to the face of the sheet, and is spaced apart from it. Note that formation of the blind head 32 does not rely upon its contact with the rear sheet 27 (although it may contact it).

FIGS. 1A to 1C are intended to illustrate the construction and function of the rivet 11, 12 insofar as the formation of the blind head 32 is concerned. Further increase of the tension force F1 will eventually cause further deformation of the rivet shell, in a manner similar to that which will now be described with reference to FIGS. 2 and 3.

The construction and function of the rivet and placing tool according to this invention, with respect to closing the gap between the sheets, and the formation of the near side head, will now be described with reference to other examples.

Figure 2A:
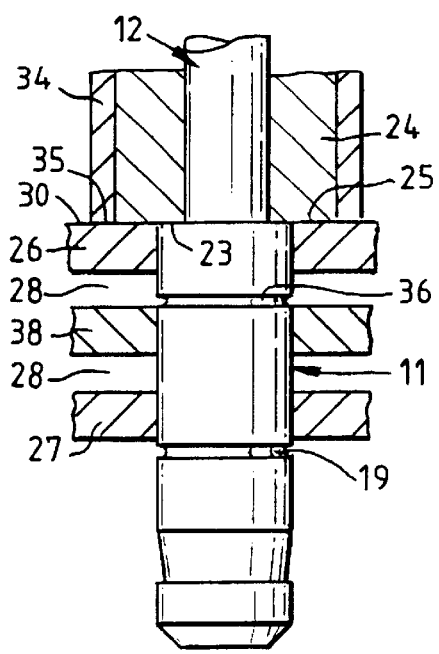
FIGS. 2A to 2E show five successive stages in the deformation of the shell of a second example rivet to form a blind head, to close the workpiece members together and to form a near side head.
Figure 2B:
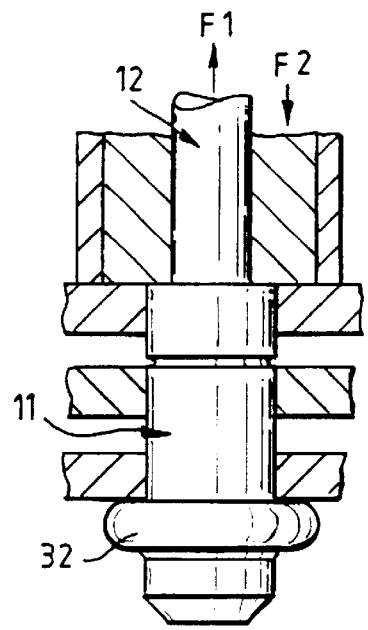

FIGS. 2A to 2E illustrate a rivet which is substantially similar to that of FIG. 1, but is a modification thereof in that it has a physically longer shell 11 to provide a larger grip (i.e. the total thickness of sheets which the rivet can join). The rivet is used to join three sheets 26, 27 and 38, with gaps 28 between adjacent sheets. The rivet shell is appropriately longer, so that when the end face 23 of the shell is level with face 30 of the near sheet 26, the external groove 19 of the shell is also beyond the rear face of the rear sheet 27 (FIG. 2A corresponds to FIG. 1A). Axial compression of the rivet shell forms a blind head 32 shown in FIG. 2B (which corresponds to FIG. 1C) in the same way as described with reference to FIG. 1.

Up to the formation of the blind head 32, the external sleeve 34 of the tool has played no part in the process. In FIG. 1 it is shown with its end face 35 remaining slightly retracted from the anvil face 25 and near face 30 of the sheets, whereas in FIG. 2 its end face 35 is level with the anvil face 25. In both cases the sleeve 34 has so far not moved with respect to the nosepiece 24. However, once the blind head 32 has been formed, the blind head can be used to pull the sheets 26, 34, 27 together. This is done by transferring the reaction force to the pull F1 on the stem from the nosepiece 24 to the sleeve 34. Preferably this transfer is progressive. The result is that, the rivet stem 12 is retracted with respect to the sleeve 34, thus compressing the sheets between the shell blind head 32 and the sleeve end face 35 which abuts the near face 30 of the near sheet 26.

If F1 is the tension force on the stem 12, F2 is the reaction force applied by the nosetip anvil face 25 to the head end face 23 of the rivet shell, and F3 is the reaction force applied by the sleeve end face 35 to the front sheet 26, then at any position substantially $F1=F2+F3$, assuming that no resultant force is supported by the sheets. The "head" end portion of the rivet shell 11 progressively emerges from the front sheet 26, with the nosetip 24 being retracted in unison with the rivet stem. Eventually the three sheets 26, 38, 27 are pulled into contact with each other so that the gaps 28,28 have disappeared, as in the position illustrated in FIG. 2C.

It is now required to form a near side head on the rivet shell, i.e. to radially enlarge the "head" most end of the shell.

Figure 2C:
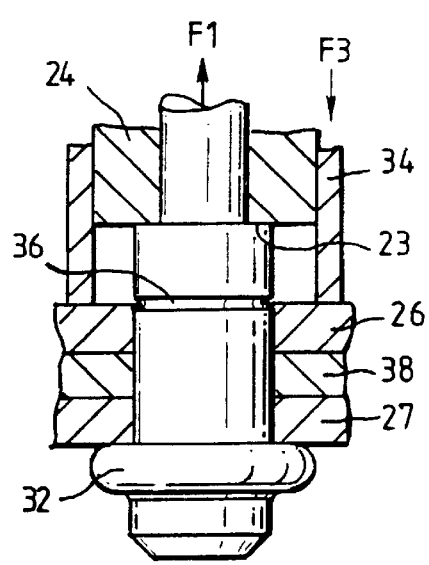
Figure 2D:
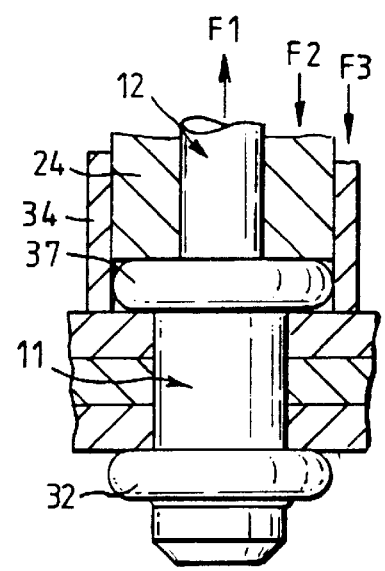
Figure 2E:
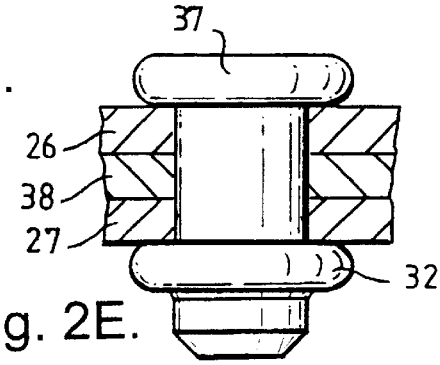

The placing tool is further actuated so that, whilst retaining the clamping force on the sheets between the blind head 32 and the sleeve 34, the force F2 on the nosepiece 24 is increased. In this example, the shell 11 is provided with a second external circumferential groove 36, which is positioned so that it lies substantially level with the near surface 30 of the near sheet 26, as illustrated in FIG. 2C. This groove 36 has less depth than the shell tail end groove 19, so that the head end groove 36 provides less weakening to the shell than the tail end groove 19. Under the increasing axial compression on the sleeve, the "head" end portion of the sleeve, between the groove 36 and the end face 23, buckles outwardly to form first a bulb and then a folded flange (like the blind head 32) which provides a near side head 37, as illustrated in FIG. 2D. Further increase in the tension force F1 on the stem causes it to break at the break neck 18 (not shown in FIGS. 2A to 2D), leaving the installed rivet to form a joint between the sheets 26, 38 and 27, as illustrated in FIG. 2E.

Note that the clamping or compression load on the sheets between the sleeve 34 and the already formed blind head 32, whilst the near side head 37 is being formed, is not reduced by the force used in deforming the rivet shell to form the near side head. The near side head 37 is formed, clamping the sheets between it and the blind head 32, whilst the sheets are already clamped together between the sleeve 34 and the blind head 32. The result is that the riveted joint provides a higher retained clamping force on the sheets than if similar deforming forces were used to form the blind head on an equivalent blind rivet with a preformed near side head. Thus the riveted joint provided by the present invention is stronger.

One form of suitable riveting tool is shown schematically in FIGS. 3A to 3F. Referring first to FIG. 3A, which shows the tool before a rivet is inserted in it, the tool 41 comprises a generally cylindrical main body 42 containing an upper hydraulic cylinder 43 and a lower pneumatic cylinder 44, the upper cylinder 43 being approximately twice as long as the lower cylinder 44. The two are separated by an annular wall 45 from which projects downwardly a cylindrical extension 46, the lower end of which protrudes from the bottom of the body 42 to provide the tool nosepiece 24 with the flat annular anvil face 25.

The tool sheet-contacting sleeve 34 surrounds the nosepiece 24, for axial movement with respect to both the tool body 42 and the nosepiece 24. The upper end of the sleeve 34 has an outward annular flange 47, which reciprocates in the lower hydraulic cylinder 44 and is urged upwardly by a coil compression spring 48. A stop (not shown) prevents the flange 47 from seating on the annular wall 45, leaving a space between the flange 47 and wall 45 connected by means of a port 49 to a source of variable hydraulic pressure (not shown).

The tool body 42 also contains a pulling piston 51 which can reciprocate with respect to the tool body. The piston 51 comprises essentially a cylindrical piston, which at about the mid point of its length has an outward flange 52 which is a sliding fit in the upper hydraulic cylinder 43. The flange is urged downwardly by a coil compression spring 53, and is prevented from seating on the annular wall 45 by means of a stop (not shown), leaving a space between the flange 52 and wall 45 which is connected by means of a port 54 with a source of variable hydraulic pressure (not shown). The lower end part of the extension 46 forming the nosepiece 24 contains the usual jaw assembly 55 for gripping rivet stems and pulling them with respect to the anvil face 25, and will not be described further.

Clearly increasing the hydraulic pressure supplied to the lower port 49 drives the sleeve 34 downwards against the urging of spring 48, and increasing the hydraulic pressure supplied to the upper port 54 drives the piston 51 and jaw assembly 55 upwards against the urging of spring 53. These hydraulic pressures are controlled in a conventional way by convenient known means, in order to move the sleeve 34 and jaw assembly 55 as required and to apply the required force to each of them in order to place a rivet in the way previously described.

In use, the stem 12 of a rivet is inserted into the nosepiece, where it is gripped by the jaw assembly 55 in the usual way, with "head" end of the rivet shell 11 in contact with the anvil face 25 as previously described. The tool is then moved to insert the rivet shell through the aligned holes 29 in the sheets to be riveted, until the anvil face contacts the near face 30 of the near sheet 26. This is the portion illustrated in FIG. 3B. FIGS. 3B to 3F show a rivet similar to that shown in FIG. 1 being placed to rivet two sheets 26, 27 together, FIG. 3B corresponding to FIG. 1A. FIGS. 3B to 3F show the near sheet 26 as being in a fixed position, and the remote sheet 27 being pulled up towards it.

With no hydraulic pressure applied to the sleeve port 49, a progressively increasing hydraulic pressure is applied to piston port 54, thus pulling the rivet stem into the nosepiece whilst holding the rivet shell against the anvil face and forming the blind head 32 (FIG. 3C) as previously described. Whilst maintaining the hydraulic pressure at piston port 54, hydraulic pressure to the sleeve port 49 is progressively increased, driving the sleeve 34 downwards to abut the part sheet 26 and then pulling on the blind head 32 to pull the sheets 27, 26 together (FIG. 3D) and apply clamping pressure to the sheets 26 and 27. The nosepiece 24 and tool body 42 move upwards with the rivet stem 12 and rivet shell 11 (accommodating similar amounts of movement of the body of a conventional hand-held blind riveting tool is common practice). Whilst at least initially maintaining the hydraulic pressure to the sleeve port 49, the hydraulic pressure to the piston port 54 is progressively further increased, thereby to drive the nosepiece 24 and anvil face 25 downwards, with respect to the rivet stem, thus forming the near side head 37 as previously described (FIG. 3E). During the latter part of this process the hydraulic pressure supply to the sleeve port 49 may be progressively reduced, so as not to overstress the stem at the breakneck 18.

The hydraulic pressure to the sleeve port 49 is then reduced sufficiently to allow the force of the spring 48 to push the sleeve 34 upwards and withdraw it from contact with the near sheet 26, so that all the reaction to the pulling force exerted on the rivet stem 12 by the pulling jaw assembly 55 is taken up through the rivet head 37, as illustrated in FIG. 3F. The hydraulic pressure to the piston port 54 is then increased until the stem breaks at the breakneck, leaving the riveted joint.

Figure 4A:
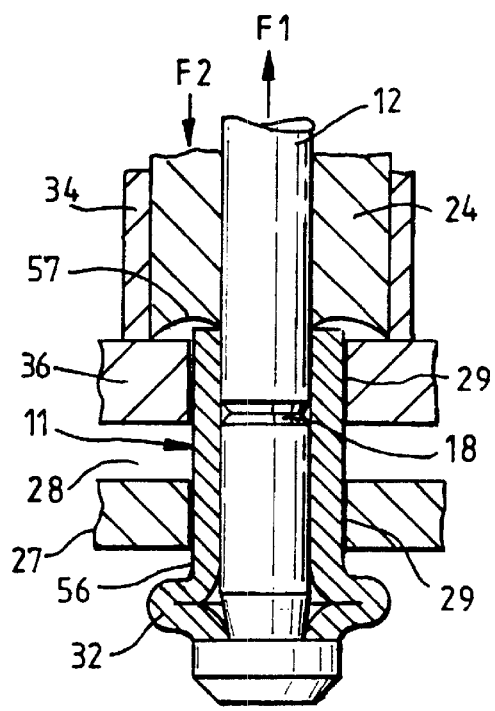
FIGS. 4A to 4D show four successive stages in the deformation of a third example rivet.
Figure 4B:
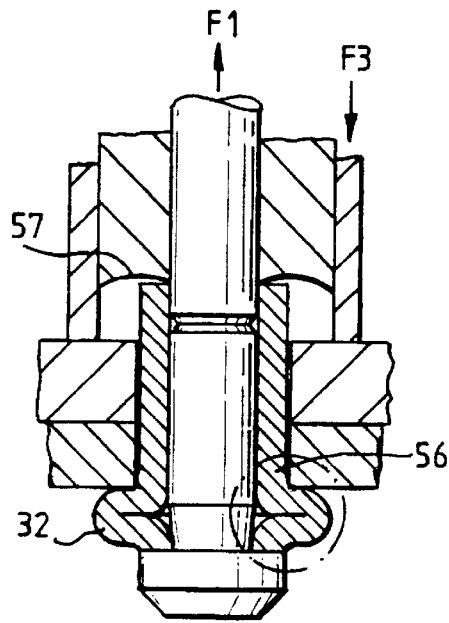
Figure 4E:
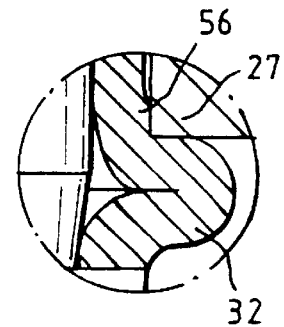
FIG. 4E is an enlargement of part of FIG. 4B.

FIGS. 4A to 4E illustrate another example rivet and method of riveting incorporating two possible alternative features. Firstly, where rivets are likely to be used in oversized holes (i.e. at least some of the holes are likely to be of slightly larger diameter than the recommended size), the radial expansion of the shell to form the blind head 32 can be configured so that the part 56 of the shell immediately adjacent the blind head flange 32 is also somewhat radially expanded, as illustrated in FIG. 4A. When the blind head is then pulled up against the remote sheet 27 to close the gap 28 and clamp the sheets 26, 27 together between the sleeve 34 and blind head 32, as previously described, this radially enlarged part 56 is forced into the remote end of the hole 29 in the remote sheet 27, to produce localised hole fill, as illustrated in FIG. 4B, providing enhanced sealing of the joint. As illustrated in enlarged FIG. 4E, the edge of the remote sheet 27 around the hole may bite into the part 56 of the shell.

Figure 4C:
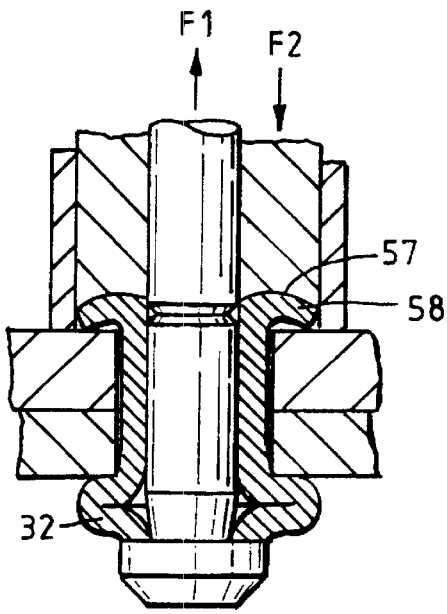
Figure 4D:
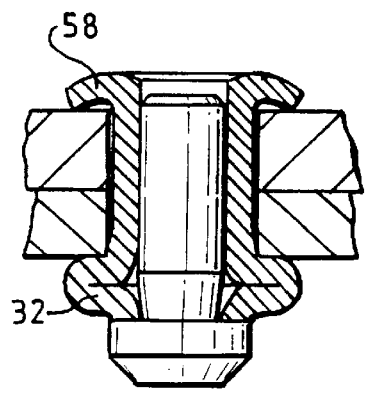
Figure 5A:
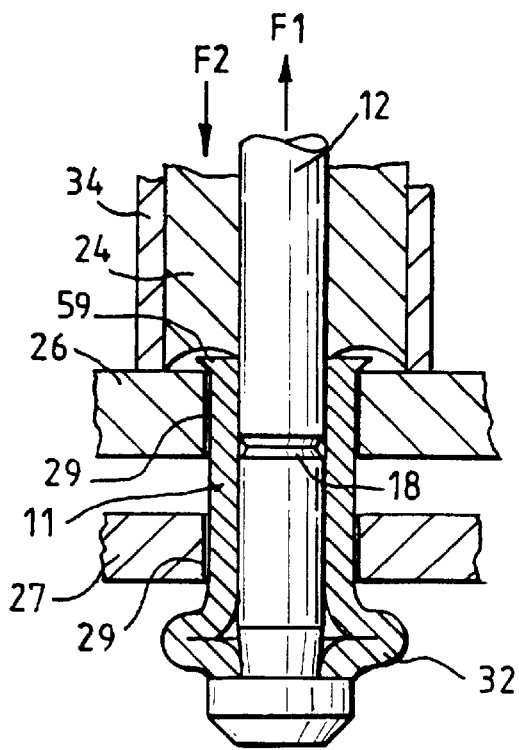
FIGS. 5A to 5D show four successive stages (corresponding to FIGS. 4A to 4D) in the deformation of a fourth example rivet.
Figure 5B:
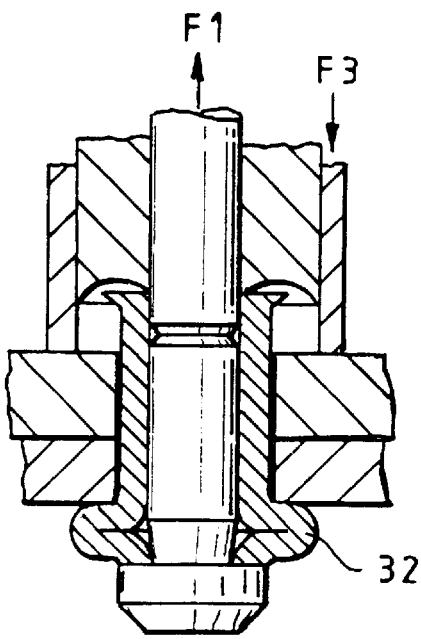
Figure 5C:
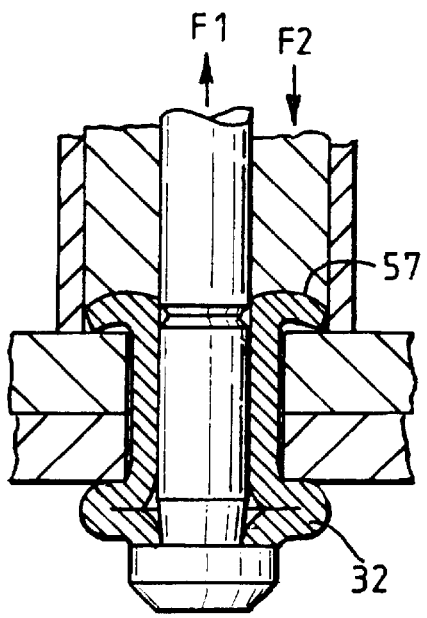
Figure 5D:
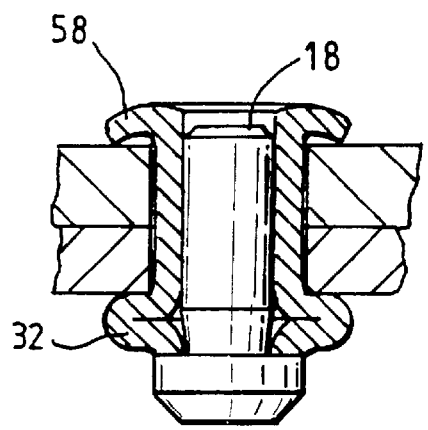

Secondly, an alternative near side head form can be used. The anvil face of the nosepiece 24 is provided with a concavely curved profile as illustrated at 57 in FIGS. 4A to 4C. When the uppermost part of the shell 11 is pulled against the concave anvil face 54 with sufficient force, it is rolled radially outwardly, as illustrated in FIG. 4C to form a near side head 58. This is bent downward by the concave anvil face 57 until the outer periphery of the underside of the head 58 abuts the near face 30 of the near sheet 26, as illustrated in FIGS. 4C and 4D. The uppermost part of the rivet shell is preferably suitably configured to co-operate with the concave anvil face 57 in this mode of deformation.

In certain applications of blind riveting, it is found more convenient first to insert the blind rivet in the hole in the sheets, and then to apply the tool to install the rivet. This method of operation is facilitated by the example rivet illustrated in FIGS. 5A to SD, in which the "head" end of the rivet shell is provided with a vestigial head 59 of minimal radial and axial extent, which is sufficient to engage the near sheet 26 and prevent the rivet from falling through the holes 29, 29 in the sheets, but would be ineffective to exert any substantial clamping force on the sheets 26, 27. Installation of the rivet including formation of the near side head takes place in the same way as previously described. FIGS. 5A to 5D illustrate the formation of a rolled-over near side head 57 as in FIGS. 4A to 4D, but equally the vestigial head 59 could be used to produce the bulbed near side head form illustrated in FIG. 2D.

Figure 6A:
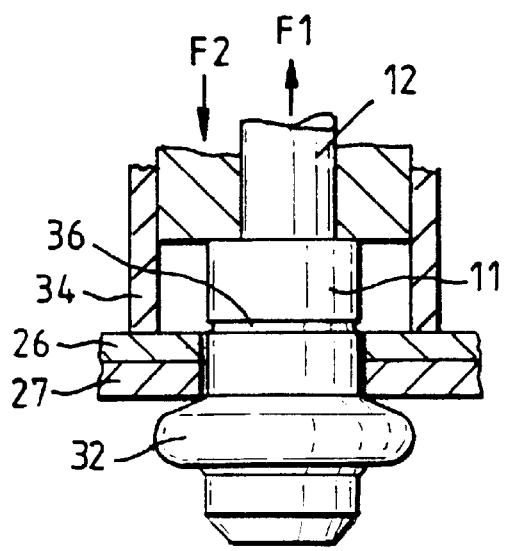
FIGS. 6A to 6D show four successive stages in the deformation of a fifth example rivet.
Figure 6B:
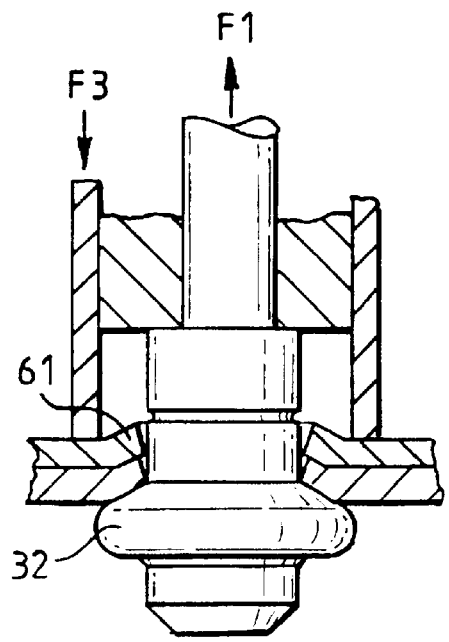
Figure 6C:
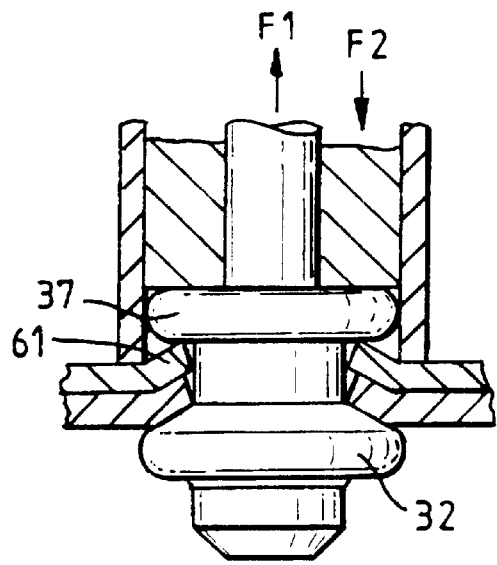
Figure 6D:
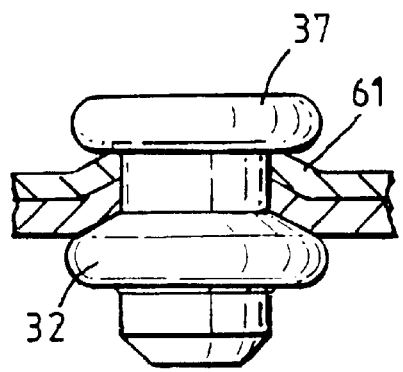

Another example rivet and method is illustrated in FIGS. 6A to 6D, for use in making joints between sheets 26, 27 which are substantially thinner and therefore weaker, than the sheets 26, 27 referred to previously in this case the force applied to the sheets 26, 27 between the blind head 32 and the tool sleeve 34 (which has a diameter much larger than the rivet shell 11 and approximately equal to that of the blind head 32) is sufficient to deform both the thin sheets in the annular region between the rivet shell 11 and the sleeve 34 into a part conical dished or dimpled form as illustrated at 61 in FIGS. 6B, 6C to 6D. The near side head 37 then abuts the top of this dimple. In order to facilitate deformation of the sheets in this way, the rivet is configured so that the blind head 32 has a convex shape on its side nearer the remote sheet 27, as illustrated in FIG. 6.

The methods of riveting, and the rivets, described in the foregoing examples are also advantageous in that it is simpler and less expensive to manufacture a blind rivet without a preformed near side head (or with only the vestigial head illustrated in FIGS. 5A to 5D).

The invention is not restricted to the details of the foregoing examples.

What is claimed is:

1. A method of blind riveting to secure together a plurality of members with aligned apertures, using a blind rivet comprising a tubular shell and a stem extending through the tubular shell, the stem having a head, the stem head being adjacent one end of the shell and the other end of the shell having no preformed radially enlarged head or only a vestigial head of minimal radial and axial extent which is ineffective to exert any substantial clamping force on the members, which method comprises the steps of:

inserting the shell through the aligned apertures in the members, from the near face of the near member, so that the aforesaid one end of the shell and an adjacent portion of the shell protrude beyond the remote face of the remote member and until the aforesaid other end of the shell is substantially level with the near face of the near member;

supporting the aforesaid other end of the shell with a supporting means and applying a first force with respect thereto to the stem so as to pull the stem head towards the aforesaid other end of the shell and cause the end portion of the shell adjacent the said one end thereof to deform to substantially form a blind head beyond the remote face of the remote member;

applying a second force to the near member with respect to the stem, to push the near member towards the blind head until any gap between the members is taken up, with the portion of the shell adjacent the aforesaid other end of the shell then protruding from the near face of the near member;

and increasing the aforesaid first force so as to deform the aforesaid protruding portion of the shell to form a near-side head, so that the members are clamped together between the blind head and the near-side head of the rivet shell.

2. A method of blind riveting as claimed in claim 1, in which the supporting means for supporting the aforesaid other end of the shell is of substantially larger transverse dimensions than the shell with which it is intended to be used.

3. A method as claimed in claim 1 or claim 2, using a blind rivet in which the stem further comprises a weakened portion, which method includes further increasing the aforesaid first force so as to cause the stem to fracture at the weakened portion.

4. A method of blind riveting as claimed in claim 1, in which the aforesaid second force is sufficiently large to apply compression to the members.

5. A method of blind riveting as claimed in claim 1, in which the second force is decreased as the first force is increased.

6. A method of blind riveting as claimed in claim 1, in which the blind head on the shell is completely formed before the start of the formation of the near-side head.

7. A method of blind riveting as claimed in claim 1, in which the completion of the formation of the blind head overlaps the start of the formation of the near-side head.

* * * * *

UNITED STATES PATENT AND TRADEMARK OFFICE
CERTIFICATE OF CORRECTION

PATENT NO.    : 6,389,676 B1
DATED         : May 21, 2002
INVENTOR(S)   : Keith Denham It is certified that error appears in the above-identified patent and that said Letters Patent is hereby corrected as shown below:

<u>Title page,</u>
Item [54], Title "BLIND RIVETING" should be -- METHOD OF BLIND RIVETING --

<u>Column 6,</u>
Line 53, "SD" should be -- 5D --
Line 61, "near side head 57" should be -- near side head 58 --

Signed and Sealed this

Twelfth Day of November, 2002

*Attest:*

*Attesting Officer*

JAMES E. ROGAN
*Director of the United States Patent and Trademark Office*